United States Patent [19]
Usui et al.

[11] Patent Number: 5,596,425
[45] Date of Patent: Jan. 21, 1997

[54] METHOD AND APPARATUS FOR SIMULATING COLOR PRINT

[75] Inventors: Nobuaki Usui, Tokyo; Hiroki Fujimoto, Tenjinkitamachi; Kazutaka Taniguchi, Tenjinkitamachi; Atsushi Imamura, Tenjinkitamachi, all of Japan

[73] Assignee: Dainippon Screen Manufacturing Co., Ltd., Japan

[21] Appl. No.: 393,331

[22] Filed: Feb. 23, 1995

[30] Foreign Application Priority Data

Feb. 23, 1994 [JP] Japan ................................ 6-051227

[51] Int. Cl.$^6$ ........................... H04N 1/46; G03B 3/10
[52] U.S. Cl. ..................... 358/500; 358/501; 358/509; 358/527
[58] Field of Search .................. 358/400, 401, 358/443, 448, 475, 480, 500, 501, 504, 509, 510, 515, 516, 517, 527, 530, 531; 355/326, 327, 220; 382/167

[56] References Cited

U.S. PATENT DOCUMENTS

| | | | |
|---|---|---|---|
| 4,905,039 | 2/1990 | Terashita | 355/35 |
| 5,408,447 | 4/1995 | Cottrell et al. | 358/509 |

OTHER PUBLICATIONS

*Transactions of Information Processing Society of Japan*, "Realistic Production of Object Color in a Three–Dimensional Space and Its Evaluation", vol. 34, No. 2, pp. 289–301.

*Transactions of Information Processing Society of Japan*, vol. 33, No. 1, pp. 37–45.

*Primary Examiner*—Edward L. Coles, Sr.
*Assistant Examiner*—Jerome Grant, II
*Attorney, Agent, or Firm*—Ostrolenk, Faber, Gerb & Soffen, LLP

[57] ABSTRACT

There is provided a model where the illuminance of reflected light from the print is expressed with a linear combination of the illuminance of specular reflection light and that of internal reflection light. On the basis of the model, three methods are applicable to compute the colors of a print disposed in the three-dimensional space. In the first method, a specular reflection coefficient and an internal reflection coefficient, which are depending upon the wavelength, are interpolated by an angle of reflection $\theta$ and an angle of deviation $\rho$, and the illuminance spectrum of the reflected light is subsequently determined (step S2). Tristimulus values X, Y, and Z are then determined by integration of the illuminance spectrum according to the color matching functions (step S3). In the second method, the tristimulus values are determined for the specular reflection light, the internal reflection light, and the environmental light, respectively, and then interpolated by the reflection angle $\theta$ and the deviation angle $\rho$ (step S4). In the third method, the chromaticity coordinates are determined respectively for the specular reflection light, the internal reflection light, and the environmental light, and then interpolated by the reflection angle $\theta$ and the deviation angle $\rho$ (step S5).

22 Claims, 9 Drawing Sheets

CHROMATICITY DIAGRAM UNDER IDEAL CONDITION

METHOD AND APPARATUS FOR SIMULATING COLOR PRINT

BACKGROUND OF THE INVENTION

1. Field of the Invention

The present invention relates to a method of and an apparatus for simulating a color print with an output device, such as a display device and a printer.

2. Description of the Related Art

In a reproduction process of a color print with various output devices like a display device and a printer, it is preferable to simulate colors as close as possible to those of the actual print. There are some known method of color reproduction or color simulation such as Murray-Davis's equation, Yule-Nielsen's equation, and Neugebauer's equation. The Neugebauer's equation converts dot percents of four color separations Y, M, C, and K into color components R, G, and B.

The above conversion equations are, however, established on the basis of idealized models and in many cases, can not reproduce the actual colors in a printed image. The conventional models are often not applicable to color simulation under the condition of observing a printed image disposed in the three-dimensional space.

SUMMARY OF THE INVENTION

An object of the present invention is thus to provide a method of and an apparatus for simulating colors of a printed color print image disposed in the three-dimensional space more precisely than the conventional methods.

The present invention is directed to a method of simulating a color of each reflection point in a color print observed by an observer with an output device, the color print being disposed in a three-dimensional space and irradiated by a light source, the light source emitting a light beam having a luminance spectrum $\phi(\lambda)$ where $\lambda$ denotes a wavelength of the light beam. The method comprises the steps of: determining an illuminance spectrum $I(\theta,\rho,\lambda)$ of reflected light reflected at the reflection point according to an equation:

$$I(\theta,\rho,\lambda) = \{S_s(\lambda)\cdot\cos^n\rho + S_b(\lambda)\cdot\cos\theta\}\phi(\lambda) + I_e(\lambda)$$

wherein $S_b(\lambda)$ and $S_s(\lambda)$ denote first and second reflection coefficients, respectively, $\rho$ denotes an angle between a first direction of the reflected light and a second direction from the reflection point to the observer, n is a constant, $\theta$ denotes an angle of reflection of the reflected light, and $I_e(\lambda)$ denotes an illuminance spectrum of environmental light observed by the observer; integrating the illuminance spectrum $I(\theta,\rho,\lambda)$ over a wavelength range of visible light with respective three color matching functions of a device-independent colorimetric system, to thereby obtain tristimulus values in the device-independent colorimetric system representing the color of the reflection point; and producing an image of the color print with the output device as a function of the tristimulus values.

In a preferred embodiment of the present invention, the first reflection coefficient $S_s(\lambda)$ regarding specular reflection light depends upon the wavelength $\lambda$.

The method further comprises the step of: converting the tristimulus values to color data in a specific colorimetric system of the output device.

The illuminance spectrum $I_e(\lambda)$ of environmental light is equal to zero.

According to an aspect of the invention, a method comprises the steps of: determining target tristimulus values X, Y, and Z of a device-independent colorimetric system for reflected light reflected at the reflection point according to equations:

$$X = k\{\cos^n\rho\cdot X_s + \cos\theta\cdot X_b + X_e\}$$

$$Y = k\{\cos^n\rho\cdot Y_s + \cos\theta\cdot Y_b + Y_e\}$$

$$Z = k\{\cos^n\rho\cdot Z_s + \cos\theta\cdot Z_b + Z_e\}$$

where $(X_s, Y_s, Z_s)$, $(X_b, Y_b, Z_b)$, and $(X_e, Y_e, Z_e)$ respectively denote first, second, and third sets of tristimulus values, k is a first constant, $\rho$ denotes an angle between a first direction of the reflected light and a second direction from the reflection point to the observer, n is a second constant, and $\theta$ denotes an angle of reflection of the reflected light; and producing an image of the color print with the output device as a function of the target tristimulus values X, Y, and Z.

In a preferred embodiment, the method further comprises the step of: converting the target tristimulus values X, Y, and Z to color data of a specific colorimetric system of the output device.

The third set of tristimulus values $(X_e, Y_e, Z_e)$ regarding environmental light are equal to zero.

According to another aspect of the present invention, a method comprises the steps of: determining target chromaticity coordinates (x,y) of a device-independent colorimetric system for reflected light reflected at the reflection point according to equations:

$$(x,y) = C_s \cdot (x_s, y_s) + C_b \cdot (x_b, y_b) + C_e \cdot (x_e, y_e)$$

$$C_s = \frac{\cos^n \rho \cdot T_s}{\cos^n \rho \cdot T_s + \cos\theta \cdot T_b + T_e}$$

$$C_b = \frac{\cos\theta \cdot T_b}{\cos^n \rho \cdot T_s + \cos\theta \cdot T_b + T_e}$$

$$C_e = \frac{T_e}{\cos^n \rho \cdot T_s + \cos\theta \cdot T_b + T_e}$$

where $(x_s, y_s)$, $(x_b, y_b)$, and $(x_e, y_e)$ denote first, second, and third chromaticity coordinates, $T_s$, $T_b$, and $T_e$ are constants, $\rho$ denotes an angle between a first direction of the reflected light and a second direction from the reflection point to the observer, n is a constant, and $\theta$ denotes an angle of reflection of the reflected light; and producing an image of the color print with the output device as a function of the target chromaticity coordinates (x,y).

The method further comprises the step of: converting the target chromaticity coordinates (x,y) to color data of a specific colorimetric system of the output device.

The third set of chromaticity coordinates $(x_e, y_e)$ and the constant $T_e$ regarding environmental light are equal to zero.

The present invention is further directed to an apparatus for simulating a color of each reflection point in a color print observed by an observer, the color print being disposed in a three-dimensional space and irradiated by a light source, the light source emitting a light beam having a luminance spectrum $\phi(\lambda)$ where $\lambda$ denotes a wavelength of the light beam. The apparatus comprises: means for determining an illuminance spectrum $I(\theta,\rho,\lambda)$ of reflected light reflected at the reflection point according to an equation:

$$I(\theta,\rho,\lambda) = \{S_s(\lambda)\cdot\cos^n\rho + S_b(\lambda)\cdot\cos\theta\}\phi(\lambda) + I_e(\lambda)$$

wherein $S_b(\lambda)$ and $S_s(\lambda)$ denote first and second reflection coefficients, respectively, $\rho$ denotes an angle between a first direction of the reflected light and a second direction from the reflection point to the observer, n is a constant, θ denotes an angle of reflection, and $I_e(\lambda)$ denotes an illuminance spectrum of environmental light observed by the observer; means for integrating the illuminance spectrum $I(\theta,\rho,\lambda)$ of the reflected light over a wavelength range of visible light with three color matching functions, respectively, of a device-independent colorimetric system, to thereby obtain tristimulus values in the device-independent colorimetric system; and output means for producing an image of the color print as a function of the tristimulus values.

The present invention is still further directed to an apparatus comprising: means for determining target tristimulus values X, Y, and Z of a device-independent colorimetric system for reflected light reflected at the reflection point according to equations:

$$X = k\{\cos^n\rho \cdot X_s + \cos\theta \cdot X_b + X_e\}$$

$$Y = k\{\cos^n\rho \cdot Y_s + \cos\theta \cdot Y_b + Y_e\}$$

$$Z = k\{\cos^n\rho \cdot Z_s + \cos\theta \cdot Z_b + Z_e\}$$

where $(X_s,Y_s,Z_s)$, $(X_b,Y_b,Z_b)$, and $(X_e,Y_e,Z_e)$ respectively denote first, second, and third sets of tristimulus values, k is a first constant, ρ denotes an angle between a first direction of the reflected light and a second direction from the reflection point to the observer, n is a second constant, and θ denotes an angle of reflection of the reflected light; and output means for producing an image of the color print as a function of the target tristimulus values X, Y, and Z.

The present invention is further directed to an apparatus comprising: means for determining target chromaticity coordinates (x,y) of a device-independent colorimetric system for reflected light according to equations:

$$(x,y) = C_s \cdot (x_s,y_s) + C_b \cdot (x_b,y_b) + C_e \cdot (x_e,y_e)$$

$$C_s = \frac{\cos^n \rho \cdot T_s}{\cos^n \rho \cdot T_s + \cos\theta \cdot T_b + T_e}$$

$$C_b = \frac{\cos\theta \cdot T_b}{\cos^n \rho \cdot T_s + \cos\theta \cdot T_b + T_e}$$

$$C_e = \frac{T_e}{\cos^n \rho \cdot T_s + \cos\theta \cdot T_b + T_e}$$

where $(x_s,y_s)$, $(x_b,y_b)$, and $(X_e,y_e)$ denote first, second, and third chromaticity coordinates, $T_s$, $T_b$, and $T_e$ are constants, ρ denotes an angle between a first direction of the reflected light and a second direction from the reflection point to the observer, n is a constant, and θ denotes an angle of reflection of the reflected light; and output means for producing an image of the color print as a function of the target chromaticity coordinates (x,y).

These and other objects, features, aspects, and advantages of the present invention will become more apparent from the following detailed description of preferred embodiments with the accompanying drawings.

DESCRIPTION OF THE PREFERRED EMBODIMENT

The description below regards: three methods of computing colors from reflection characteristics of a color print; a method of measuring illuminance spectra of the reflected light, or illuminance of the reflected light with respect to each wavelength; and a method of practical color reproduction.

A. First Method of Color Computation

Figure 1:
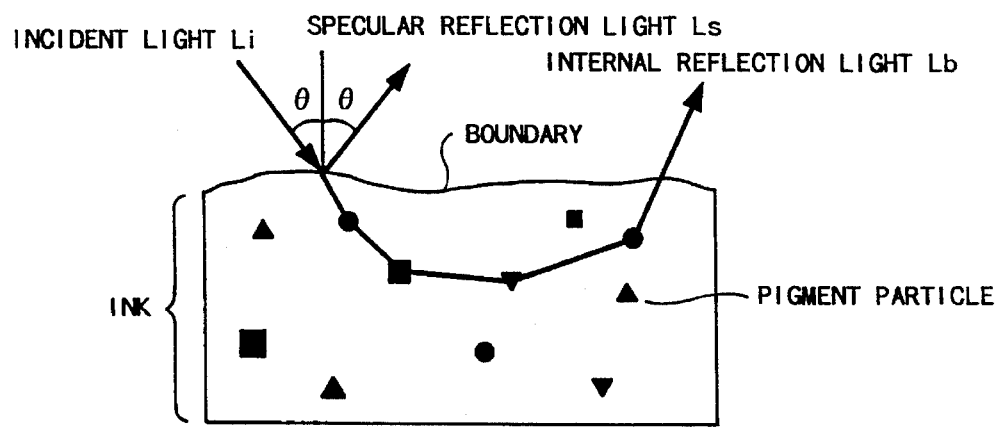
FIG. 1 shows reflection of incident light by ink on a printing paper.

FIG. 1 shows reflection of incident light by ink on a printing paper. An incident light beam Li entering the ink is reflected via two different paths as shown in FIG. 1. A first one is specular reflection light Ls, which is a reflection of the incident light Li from a boundary between the surface of ink and the air. A second one is internal reflection light Lb. A light beam passing through the surface of ink is scattered by pigment particles of the ink and emitted as the internal reflection light Lb.

Figure 2:
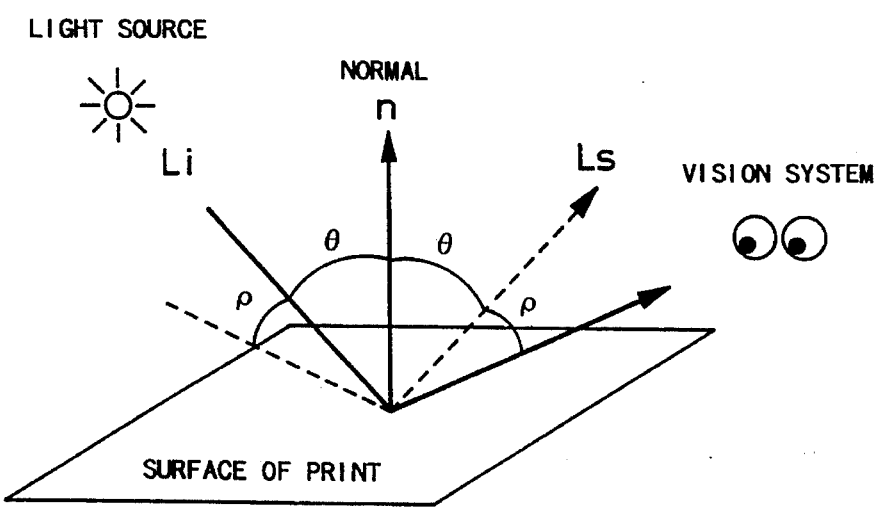
FIG. 2 shows the relationship between a light source, a print, and a vision system (or an observer)

FIG. 2 shows the relationship between a light source, a print, and a vision system (or an observer). The position of the vision system is generally deviated from the direction of the specular reflection light Ls by an angle of ρ (hereinafter referred to as the angle of deviation ρ) as clearly seen in FIG. 2. The line drawn between a reflection point on the surface of the print and the vision system, which corresponds to the direction of observation, may not exist on the plane defined by the incident light beam Li and the specular reflection light Ls. In such a case, the angle of deviation ρ is defined by the angle of the specular reflection light Ls and the direction of observation.

The illuminance of the reflected light observed by the observer in FIG. 2 is a linear combination of the illuminance of the specular reflection light Ls and that of the internal reflection light Lb, which is expressed as:

$$I(\theta,\rho,\lambda) = I_s(\theta,\rho,\lambda) + I_b(\theta,\rho,\lambda) \tag{1}$$

where λ, $I(\theta,\rho,\lambda)$, $I_s(\theta,\rho,\lambda)$, and $I_b(\theta,\rho,\lambda)$ respectively denote a wavelength of light, an illuminance spectrum or a spectral illuminance of the reflected light observed, an illuminance spectrum of the specular reflection light Ls, and an illuminance spectrum of the internal reflection light Lb. The illuminance spectra $I(\theta,\rho,\lambda)$, $I_s(\theta,\rho,\lambda)$, and $I_b(\theta,\rho,\lambda)$ depend upon the angle of reflection θ, the angle of deviation ρ, and the wavelength λ.

On the assumption that the illuminance spectra $I_s(\theta,\rho,\lambda)$ and $I_b(\theta,\rho,\lambda)$ are respectively divided into angle components and wavelength components, Equation 1 is rewritten as:

$$I(\theta,\rho,\lambda)=\{S_s(\lambda)\cdot A_s(\theta,\rho)+S_b(\lambda)\cdot A_b(\theta,\rho)\}\phi(\lambda) \quad (2)$$

where $S_b(\lambda)$ denotes a coefficient of internal reflection, $S_s(\lambda)$ denotes a coefficient of specular reflection, $\phi(\lambda)$ denotes a luminance spectrum or a spectral luminance depending upon the wavelength λ of the incident light, $A_s(\theta,\rho)$ denotes an angle component of the specular reflection light Ls, and $A_b(\theta,\rho)$ denotes an angle component of the internal reflection light Lb.

The illuminance of the specular reflection light Ls has the maximum value at the point of observation which is in the direction of the reflected light with the angle θ, and abruptly decreases in response to the deviation from the direction. Referring to such phenomena, the angle component $A_s(\theta,\rho)$ of the specular reflection light Ls in Equation 2 may be expressed as an n-th power of cosρ, where n represents a constant experimentally determined, while the angle component $A_b(\theta,\rho)$ is expressed as cos θ. Upon such assumptions, Equation 2 is further rewritten as:

$$I(\theta,\rho,\lambda)=\{S_s(\lambda)\cdot\cos^n\rho+S_b(\lambda)\cdot\cos\theta\}\phi(\lambda) \quad (3)$$

In actual observation of a printed image, there exist, other than a standard light source, natural light and other environmental light, which come to the observation point directly or after being reflected from the printed image. A general expression of the illuminance spectrum $I(\theta,\rho,\lambda)$ of the observed reflected light is given by addition of an illuminance spectrum $I_e(\lambda)$ of the environmental light to the right hand side of Equation 3 as follows:

$$I(\theta,\rho,\lambda)=\{S_s(\lambda)\cdot\cos^n\rho+S_b(\lambda)\cdot\cos\theta\}\phi(\lambda)+I_e(\lambda) \quad (4)$$

In Equation 4, the coefficients of reflection $S_s(\lambda)$ and $S_b(\lambda)$ and the exponent n can be determined by measuring a illuminance spectrum of the reflected light with a light source which has the luminance spectrum $\phi(\lambda)$ and by analyzing the results of the measurement. Details of the measurement process will be described later. In a preferable application, the illuminance spectrum $I_e(\lambda)$ of the environmental light can be determined in advance as a prerequisite for color reproduction. In this case, unknown variables in Equation 4 are only the angle of reflection θ and the angle of deviation ρ, which will be determined by setting three-dimensional relative positions of the observer, the printed image, and the light source. Substitution of the angle of reflection θ and the angle of deviation ρ thus determined into Equation 4 will give the illuminance spectrum $I(\theta,\rho,\lambda)$ of the reflected light. With the illuminance spectrum $I(\theta,\rho,\lambda)$ thus determined, tristimulus values X, Y, and Z in the CIE-XYZ colorimetric system are given by:

$$X=k\int_{380}^{780} I(\theta,\rho,\lambda)\cdot\bar{x}(\lambda)d\lambda \quad (5a)$$

$$Y=k\int_{380}^{780} I(\theta,\rho,\lambda)\cdot\bar{y}(\lambda)d\lambda \quad (5b)$$

$$Z=k\int_{380}^{780} I(\theta,\rho,\lambda)\cdot\bar{z}(\lambda)d\lambda \quad (5c)$$

where $\bar{x}(\lambda)$, $\bar{y}(\lambda)$, and $\bar{z}(\lambda)$ denote color matching functions.

Conversion of the tristimulus values X, Y, and Z obtained by Equations 5a through 5c, or their chromaticity coordinates (x,y,z), into color data of a colorimetric system, for example, the RGB colorimetric system, of an output device will precisely reproduce the colors of the printed image by the output device.

B. Second Method of Color Computation

The second method of color computation executes the integration of the first method in advance and utilizes the results of the integrations in computing colors.

Substitution of Equation 4 into Equations 5a through 5c gives:

$$X=k\left\{\cos^n\rho\int_{380}^{780}S_s(\lambda)\cdot\phi(\lambda)\cdot\bar{x}(\lambda)d\lambda+ \right. \quad (6a)$$
$$\left. \cos\theta\int_{380}^{780}S_b(\lambda)\cdot\phi(\lambda)\cdot\bar{x}(\lambda)d\lambda+\int_{380}^{780}I_e(\lambda)\cdot\bar{x}(\lambda)d\lambda\right\}$$

$$Y=k\left\{\cos^n\rho\int_{380}^{780}S_s(\lambda)\cdot\phi(\lambda)\cdot\bar{y}(\lambda)d\lambda+ \right. \quad (6b)$$
$$\left. \cos\theta\int_{380}^{780}S_b(\lambda)\cdot\phi(\lambda)\cdot\bar{y}(\lambda)d\lambda+\int_{380}^{780}I_e(\lambda)\cdot\bar{y}(\lambda)d\lambda\right\}$$

$$Z=k\left\{\cos^n\rho\int_{380}^{780}S_s(\lambda)\cdot\phi(\lambda)\cdot\bar{z}(\lambda)d\lambda+ \right. \quad (6c)$$
$$\left. \cos\theta\int_{380}^{780}S_b(\lambda)\cdot\phi(\lambda)\cdot\bar{z}(\lambda)d\lambda+\int_{380}^{780}I_e(\lambda)\cdot\bar{z}(\lambda)d\lambda\right\}$$

The terms of the right hand side of each of Equations 6a through 6c can be rewritten with tristimulus values (Xb,Yb,Zb) of the internal reflection light, tristimulus values (Xs,Ys,Zs) of the specular reflection light, and tristimulus values (Xe,Ye,Ze) of the environmental light as follows:

$$(X_s,Y_s,Z_s)=k\int_{380}^{780}S_s(\lambda)\cdot\phi(\lambda)\cdot(\bar{x}(\lambda),\bar{y}(\lambda),\bar{z}(\lambda))d\lambda \quad (7a)$$

$$(X_b,Y_b,Z_b)=k\int_{380}^{780}S_b(\lambda)\cdot\phi(\lambda)\cdot(\bar{x}(\lambda),\bar{y}(\lambda),\bar{z}(\lambda))d\lambda \quad (7b)$$

$$(X_e,Y_e,Z_e)=k\int_{380}^{780}I_e(\lambda)\cdot(\bar{x}(\lambda),\bar{y}(\lambda),\bar{z}(\lambda))d\lambda \quad (7c)$$

Using Equations 7a through 7c, the tristimulus values X, Y, and Z are given by:

$$X=k\{\cos^n\rho\cdot X_s+\cos\theta\cdot X_b+X_e\} \quad (8a)$$

$$Y=k\{\cos^n\rho\cdot Y_s+\cos\theta\cdot Y_b+Y_e\} \quad (8b)$$

$$Z=k\{\cos^n\rho\cdot Z_s+\cos\theta\cdot Z_b+Z_e\} \quad (8c)$$

The sum of the tristimulus values X+Y+Z is expressed as:

$$X+Y+Z=k\{\cos^n\rho(X_s+Y_s+Z_s)+\cos\theta(X_b+Y_b+Z_b)+(X_e+Y_e+Z_e)\} \quad (9)$$

Since Equations 7a through 7c do not include the angle of reflection θ and the angle of deviation ρ, the three sets of tristimulus values (Xs,Ys,Zs), (Xb,Yb,Zb), and (Xe,Ye,Ze)

can be determined in advance by setting the coefficients of reflection $S_s(\lambda)$ and $S_b(\lambda)$, the luminance spectrum $\phi(\lambda)$ of the light source, and the illuminance spectrum $I_e(\lambda)$ of the environmental light and by executing the integrations of Equations 7a through 7c.

The three sets of tristimulus values (Xs,Ys,Zs), (Xb,Yb,Zb), and (Xe,Ye,Ze) thus obtained are used to determine the tristimulus values (X,Y,Z) of the reflected light by substituting the angle of reflection $\theta$ and the angle of deviation $\rho$ into Equations 8a through 8c. Since the second method executes the integrations prior to the color computation, it has such an advantage that only the relatively simple operations are required for determination of the tristimulus values (X,Y,Z) of the reflected light in the actual color reproduction process.

In the second method of color computation, chromaticity coordinates $(x_s,y_s)$, $(X_b,y_b)$, and $(x_e,y_e)$ may be used in place of the tristimulus values (Xs,Ys,Zs), (Xb,Yb,Zb), and (Xe,Ye,Ze).

C. Third Method of Color Computation

Based on the substitution given by the following Equations 10a through 10c, the right hand side of Equation 9 is rewritten as Equation 11 given below:

$$X_s+Y_s+Z_s=T_s \quad (10a)$$

$$X_b+Y_b+Z_b=T_b \quad (10b)$$

$$X_e+Y_e+Z_e=T_e \quad (10c)$$

$$X+Y+Z=k\{\cos^n\rho \cdot T_s+\cos\theta \cdot T_b+T_e\} \quad (11)$$

Equations 8a through 8c and Equation 11 give the chromaticity coordinate x corresponding to the tristimulus values (X,Y,Z) as:

$$X=\frac{X}{X+Y+Z}=\frac{k\{\cos^n\rho \cdot X_s+\cos\theta \cdot X_b+X_e\}}{k\{\cos^n\rho \cdot T_s+\cos\theta \cdot T_b+T_e\}} \quad (12)$$

Equation 12 can be rewritten as Equation 13 by using the general relation specified as Equation 14 and by defining Cs, Cb, and Ce by Equations 15a through 15c:

$$x = \frac{k\{\cos^n\rho \cdot x_s \cdot T_s+\cos\theta \cdot x_b \cdot T_b+x_e \cdot T_e\}}{k\{\cos^n\rho \cdot T_s+\cos\theta \cdot T_b+T_e\}} \quad (13)$$

$$= C_s \cdot x_s + C_b \cdot x_b + C_e \cdot x_e$$

$$X_s = x_s \cdot T_s \quad (14a)$$

$$X_b = x_b \cdot T_b \quad (14b)$$

$$X_e = x_e \cdot T_e \quad (14c)$$

$$C_s = \frac{\cos^n\rho \cdot T_s}{\cos^n\rho \cdot T_s+\cos\theta \cdot T_b+T_e} \quad (15a)$$

$$C_b = \frac{\cos\theta \cdot T_b}{\cos^n\rho \cdot T_s+\cos\theta \cdot T_b+T_e} \quad (15b)$$

$$C_e = \frac{T_e}{\cos^n\rho \cdot T_s+\cos\theta \cdot T_b+T_e} \quad (15c)$$

The similar equations to Equation 13 will be given for the other chromaticity coordinates y and z. The chromaticity coordinates (x,y) of the reflected light are thus given by:

$$(x,y)=C_s\cdot(x_s,y_s)+C_b\cdot(X_b,y_b)+C_e\cdot(X_e,y_e) \quad (16)$$

Since x+y+z=1 holds from the definitions of the chromaticity coordinates, the chromaticity coordinate z is also obtainable from Equation 16.

The meaning of Equation 16 will be easily understandable under the ideal observation condition without any environmental light. The third term of the right hand side of Equation 16 is equal to zero under the ideal observation condition with no environmental light. In this case, Equation 16 and Equations 15a through 15c can be rewritten respectively as Equation 17 and Equations 18a and 18b given below:

$$(x,y) = C_s \cdot (x_s,y_s) + C_b \cdot (x_b,y_b) \quad (17)$$

$$C_s = \frac{\cos^n\rho \cdot T_s}{\cos^n\rho \cdot T_s+\cos\theta \cdot T_b} \quad (18a)$$

$$C_b = \frac{\cos\theta \cdot T_b}{\cos^n\rho \cdot T_s+\cos\theta \cdot T_b} \quad (18b)$$

Equation 17 gives the chromaticity coordinates (x,y) of the reflected light in observation of the reflected light with the vision system shown in FIG. 2 under the ideal condition with no environmental light.

Figure 3:
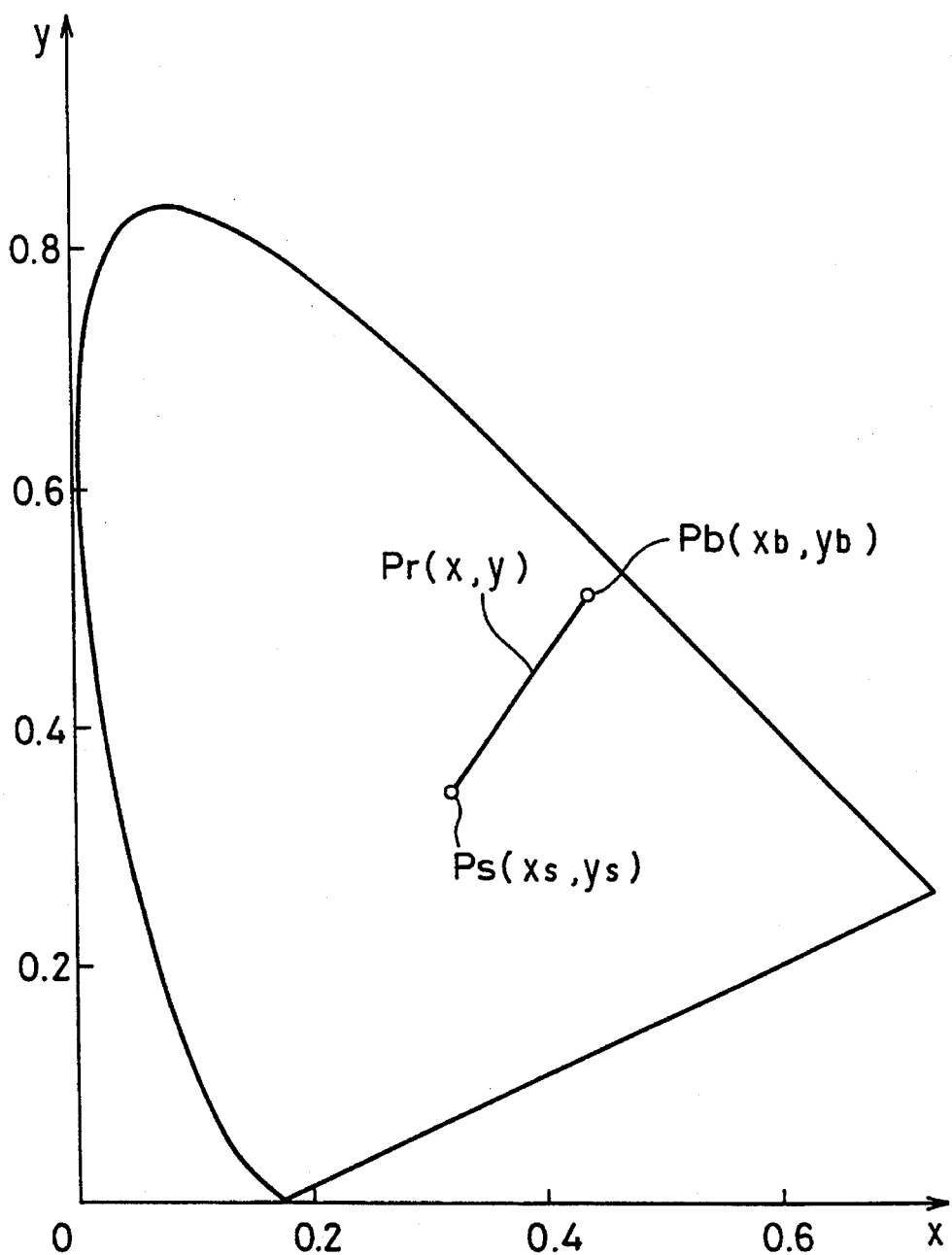
FIG. 3 is a chromaticity diagram of the chromaticity point $Ps(x_s,y_s)$ of the specular reflection light Ls and the same $Pb(x_b,y_b)$ of the internal reflection light Lb under the ideal condition with no environmental light.

As clearly understandable from Equations 7a through 7c, $(x_s,y_s)$ and $(X_b,y_b)$ of Equation 17 respectively represent the coordinates of the specular reflection light Ls and those of the internal reflection light Lb. FIG. 3 is a chromaticity diagram of the chromaticity point $Ps(x_s,y_s)$ of the specular reflection light Ls and the same Pb $(x_b,y_b)$ of the internal reflection light Lb under the ideal condition with no environmental light. As illustrated in FIG. 3, the chromaticity point Pr(x,y) of the reflected light given by Equation 17 exists on a line drawn between the chromaticity point Ps(xs,ys) of the specular reflection light Ls and the chromaticity point $Pb(x_b,y_b)$ of the internal reflection light Lb. The chromaticity point Pr of the reflected light is the point of division between the chromaticity points Ps and Pb as described below.

The coefficients of reflection $S_s(\lambda)$ and $S_b(\lambda)$ used in Equations 7a through 7c are determined by measuring the reflection factors with a light source having the predetermined luminance spectrum $\phi(\lambda)$ according to the process described below under the ideal condition with no environmental light. The two sets of tristimulus values (Xs,Ys,Zs) and (Xb,Yb,Zb) are determined by substituting the coefficients of reflection $S_s(\lambda)$ and $S_b(\lambda)$ and the luminance spectrum $\phi(\lambda k\ )$ into Equations 7a through 7c. The chromaticity coordinates $(x_s,y_s)$ of the specular reflection light Ls and the chromaticity coordinates $(X_b,y_b)$ of the internal reflection light Lb included in the right hand side of Equation 17 can be determined according to the definitions of the tristimulus values (Xs,Ys,Zs) and (Xb,Yb,Zb) given as Equations 14 and 10a through 10c.

The coefficients Ts and Tb of the right hand side of Equations 18 are constant as shown by Equations 10, and the coefficients Cs and Cb therefore depend upon only the angle of reflection $\theta$ and the angle of deviation $\rho$. Since both the angles $\theta$ and $\rho$ range between 0 degree and 90 degrees, the coefficients Cs and Cb have always positive values. The sum of the coefficients Cs and Cb is equal to one under the condition with no environmental light as follows:

$$C_s+C_b=1 \quad (19)$$

The chromaticity point Pr(x,y) of the reflected light given by Equation 13 and the similar equation for y is the point of division between the chromaticity points $Ps(x_s,y_s)$ and $Pb(x_b,y_b)$ by the coefficients Cs and Cb, which are determined according to the angle of reflection $\theta$ and the angle of deviation $\rho$. As described previously, the chromaticity point Ps of the specular reflection light Ls and the chromaticity point Pb of the internal reflection light Lb may be determined in advance through the measurement. Accordingly, the chromaticity coordinates (x,y) of the reflected light from a color print, which is disposed in the three-dimensional space, will be obtained by substituting the angle of reflection $\theta$ and the angle of deviation $\rho$ into Equations 17 and 18.

In reproduction of a color print under practical observation conditions with environmental light, Equations 16 and 15a through 15c are used instead of Equations 17 and 18. Upon condition that the coefficient Te of the environmental light is a constant, the coefficients Cs, Cb, and Ce are determined with the angle of reflection $\theta$ and the angle of deviation $\rho$. The chromaticity coordinates $(x_e, y_e)$ of the environmental light can be set to a specific value representing the environment. The chromaticity coordinates (x,y) of the reflected light will be thus determined according to the magnitudes of the angle of reflection $\theta$ and the angle of deviation $\rho$.

In one preferable application, plural sets of environmental light-based components Te, $x_e$, $Y_e$ representing typical observation environments such as print shops and offices are prepared in advance, and an appropriate one is selected among the plural sets in color reproduction.

Since the second method and the third method of color computation do not require the integration operations, they can determine the chromaticity of the reflected light more readily and quickly than the first method of color computation.

Any of the three methods of color computation is applicable to determine the chromaticity of a color print disposed in the three-dimensional space from the angle of reflection $\theta$ and the angle of deviation $\rho$ of the observation direction from the reflection direction. Accordingly, the above methods can simulate the observation of the color print from various angles. When the angle of deviation $\rho$ is substantially equal to zero degree, for example, the above methods can simulate the glossy condition of the color print where the component of the specular reflection light Ls becomes significantly large.

As is generally known, a model called 'standard dichromatic reflection model' is applicable to reflection from such objects as plastics, pottery, and polyvinyl resins. The 'standard dichromatic reflection model' is constructed on the assumption that the specular reflection coefficient Ss in Equation 2 is constant irrespective of the wavelength $\lambda$. The 'standard dichromatic reflection model' cannot, however, be applied to color prints, which require considering the dependence of the specular reflection coefficient Ss on the wavelength $\lambda$. The first through the third methods of color computation described above take into account the wavelength dependence of the specular reflection coefficient Ss to compute the colors of a color print. These methods accordingly allow the colors of the color print to be reproduced more precisely than the conventional method.

D. Measurement of Reflection Properties of Printed Image

For determination of the reflection coefficients $S_s(\lambda)$ and $S_b(\lambda)$ in Equations 12, print samples were prepared and their reflection properties were measured. The total of six samples were prepared by solidly printing inks of yellow, cyan, and magenta on two different types of printing paper, that is, art paper and coated paper, respectively.

Figure 4:
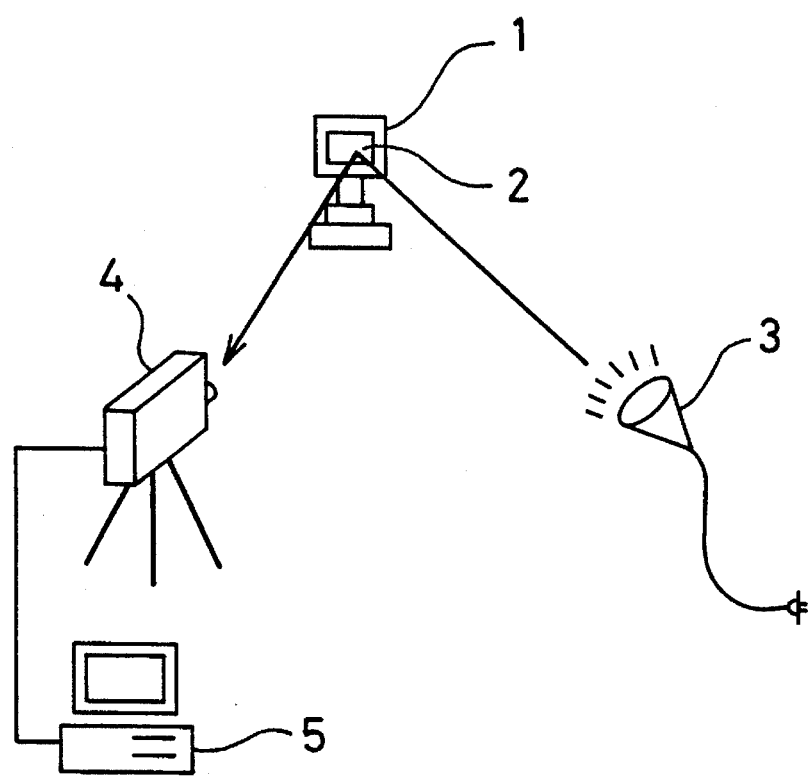
FIG. 4 conceptually shows a measurement system for reflection properties of a printed image.

FIG. 4 conceptually shows a measurement system for reflection properties. While a sample 2 placed on an optical sample table 1 was irradiated with light emitted from a light source 3, the illuminance or illuminance spectrum of the reflected light was measured with a spectral radiance meter 4. The data obtained were analyzed by a personal computer 5. The light source 3 used here was a day-light flood light of standard illuminance D65. The measurement was conducted in a dark room to realize the ideal observation condition without any environmental light.

Figure 5:
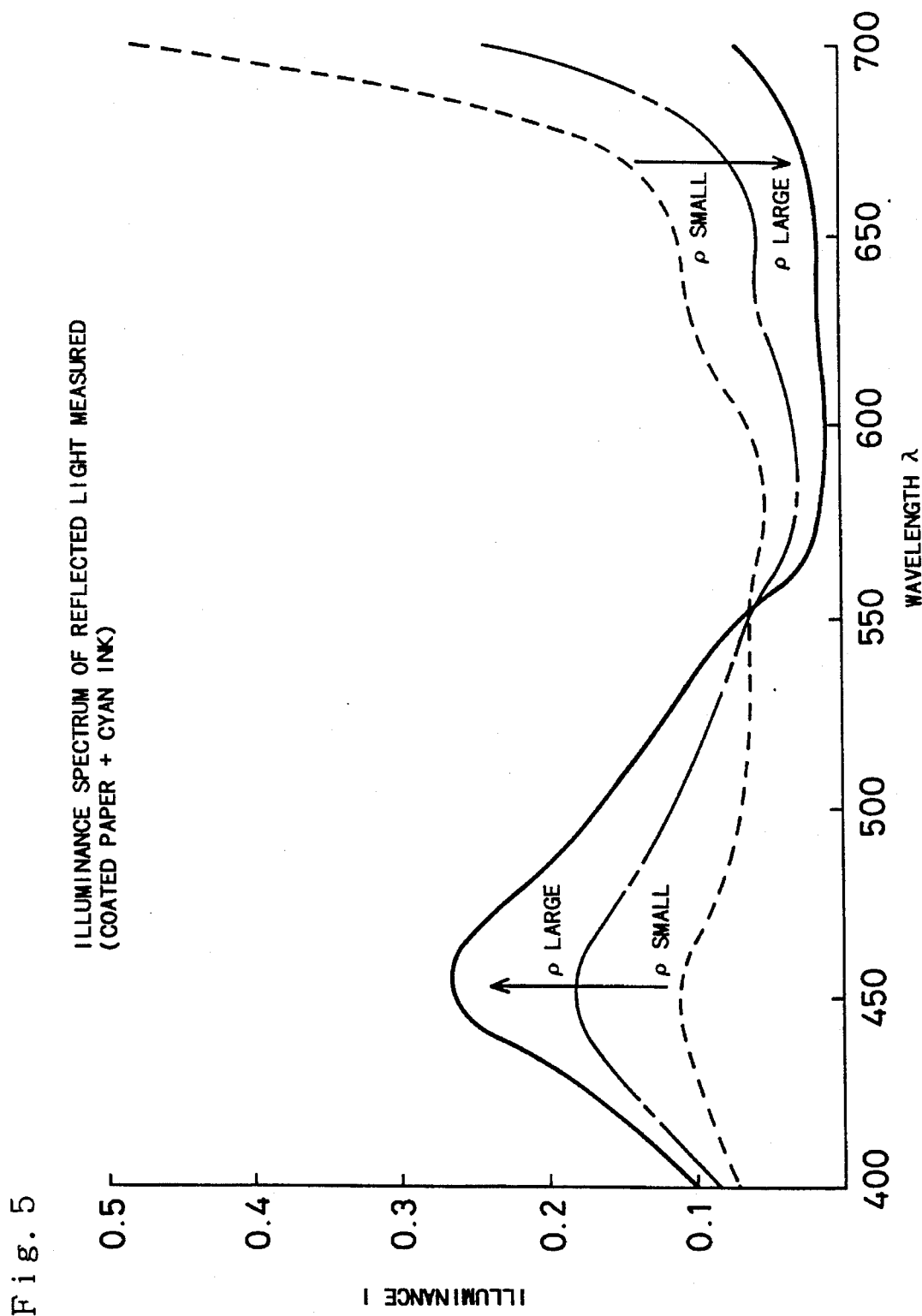
FIG. 5 is a graph showing an example of the illuminance spectra of the reflected light measured.

The illuminance spectra of the reflected light were measured with the measurement system shown in FIG. 4 under a plurality of conditions that the angle of reflection $\theta$ and the angle of deviation $\rho$ are varied parametrically. FIG. 5 is a graph showing an example of the illuminance spectra obtained at three different values of the deviation angle $\rho$ for the sample prepared by solidly printing cyan ink onto coated paper. As illustrated in FIG. 5, the shape of the spectra varies with the angle of deviation $\rho$. The illuminance spectrum does not, on the other hand, change the shape in response to the change of the angle of reflection $\theta$, but uniformly increases or decreases as the angle of reflection $\theta$. The illuminance spectra of FIG. 5 correspond to the illuminance spectrum $I(\theta,\rho,\lambda)$ of the reflected light in Equation 3.

Analysis of the data of illuminance spectrum $I(\theta,\rho,\lambda)$ by Singular Value Decomposition (SVD) was then performed to determine whether the illuminance spectrum $I(\theta,\rho,\lambda)$ could be expressed by linear combination of variable-separated components as Equation 3. The results of the Singular Value Decomposition showed that the contribution rate up to the second singular value was extremely high as 0.9996 or greater in any one of the six samples measured. This proved that the illuminance spectrum $I(\theta,\rho,\lambda)$ of the reflected light could be expressed in the form of Equation 3.

The specular reflection coefficient $S_s(\lambda)$ and the internal reflection coefficient $S_b(\lambda)$ will be determined by solving simultaneous equations, which are obtained by substituting into Equation 3 plural sets of data of illuminance spectrum $I(\theta,\rho,\lambda)$ collected under such condition that the angle of reflection $\theta$ (or the angle of incidence $\theta$) is varied while the angle of deviation $\rho$ is kept equal to zero degree. Alternatively, the specular reflection coefficient $S_s(\lambda)$ and the internal reflection coefficient $S_b(\lambda)$ can be determined by a method of least squares. In the latter method, $S_s(\lambda)$ and $S_b(\lambda)$ having the least squares sum in Equation 3 are determined from the plural sets of the data of illuminance spectrum $I(\theta,\rho,\lambda)$ obtained under the condition that the angle of reflection $\theta$ is varied while the angle of deviation $\rho$ is kept equal to zero degree.

The exponent n of cos $\rho$ will be determined by the least squares method from the plural sets of the data of illuminance spectrum $I(\theta,\rho,\lambda)$ obtained under the condition that the angle of reflection $\theta$ is kept constant while the angle of deviation $\rho$ is varied.

Figure 6:
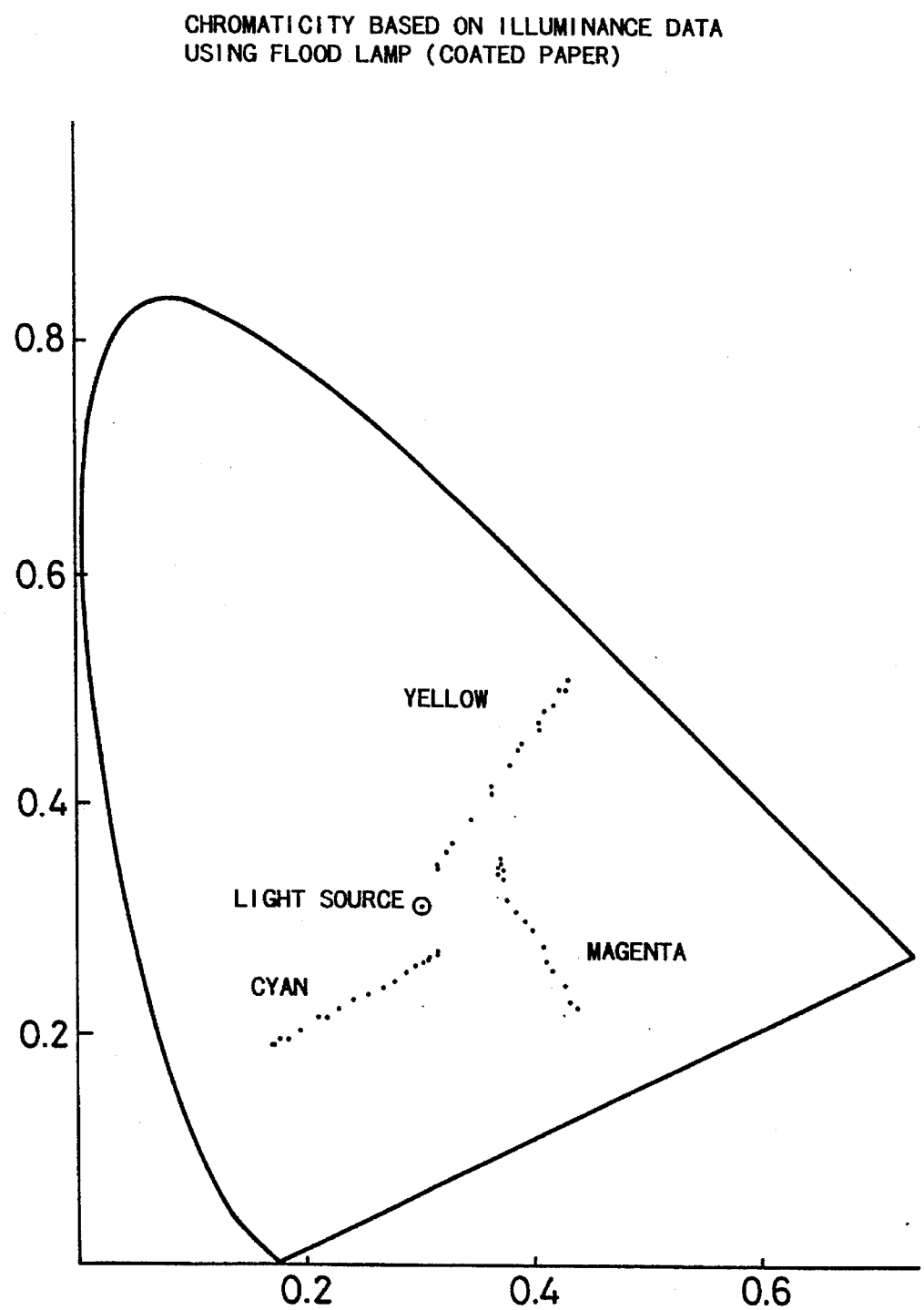
FIG. 6 is a graph showing the chromaticity data of the reflected light obtained for coated paper samples.
Figure 7:
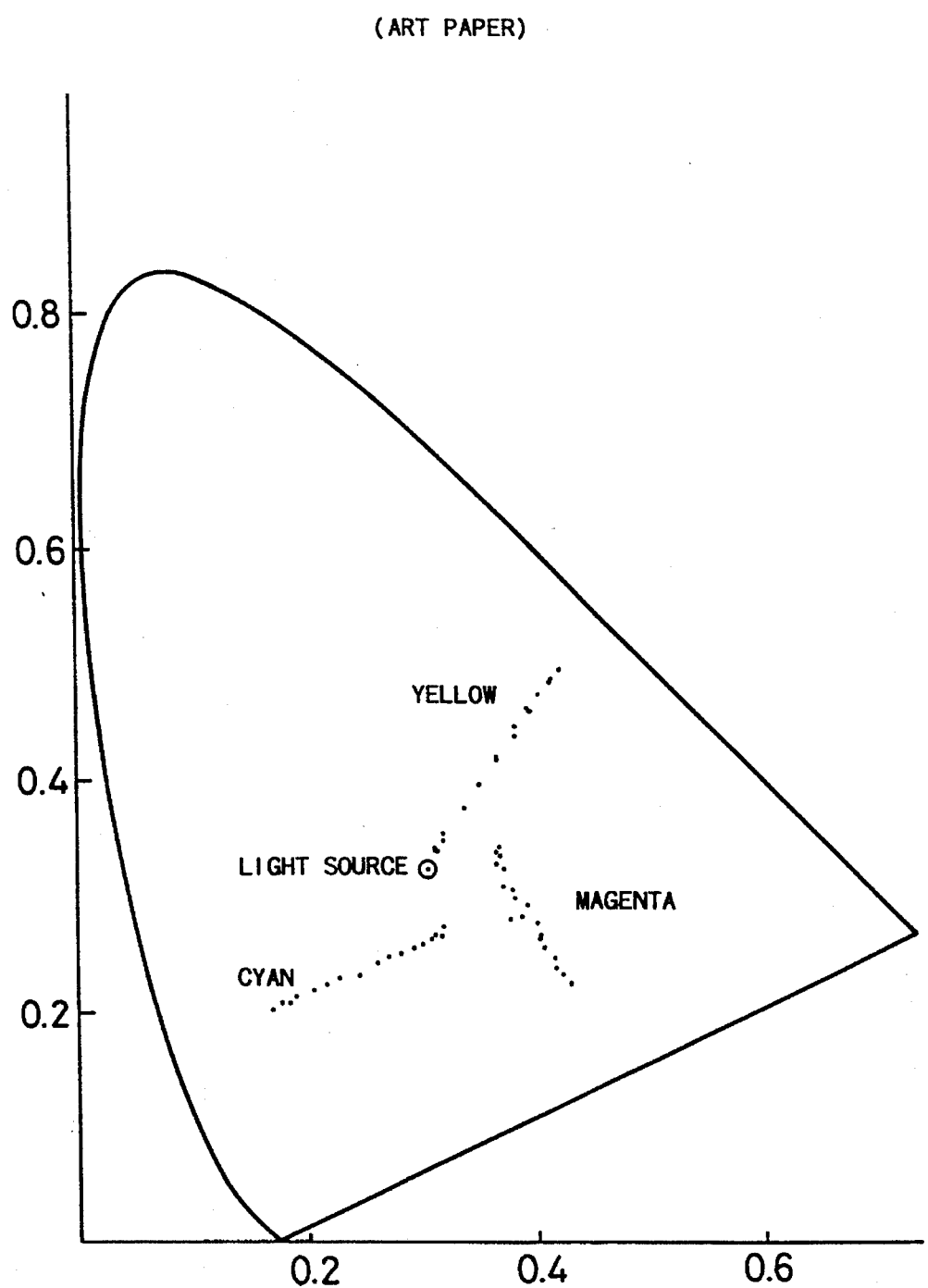
FIG. 7 is a graph showing the chromaticity data of the reflected light obtained for art paper samples.

FIGS. 6 and 7 are graphs showing the chromaticity data of the reflected light obtained for the six samples. FIG. 6 and FIG. 7 respectively show the results of coated paper samples and art paper samples.

In the results of the coated paper samples shown in FIG. 6, the chromaticity data of the reflected light substantially follow a straight line for each ink of yellow, cyan, and magenta. The chromaticity point of the light source is also shown in FIG. 6 for the reference. The terminal points of the chromaticity data of each ink correspond to the chromaticity point Ps of the specular reflection light and the chromaticity point Pb of the internal reflection light shown in FIG. 3. As is generally known, upon condition that the standard dichromatic reflection model having a constant specular reflection coefficient Ss is applicable, the chromaticity point Ps of the specular reflection light is identical with the chromaticity point of the light source. On the contrary, none of the straight lines, which the chromaticity data of the respective inks follow, goes through the chromaticity point of the light source in FIG. 6. This shows that the standard dichromatic reflection model is not applicable to actual color prints on paper.

The results of FIG. 6 clearly show that the data of chromaticity follow a straight line in each ink sample printed on coated paper and therefore that the third method described above is favorably applicable to reproduce the colors of a print precisely. This is also true for the art paper samples shown in FIG. 7.

D. Color Reproduction Method

Figure 8:
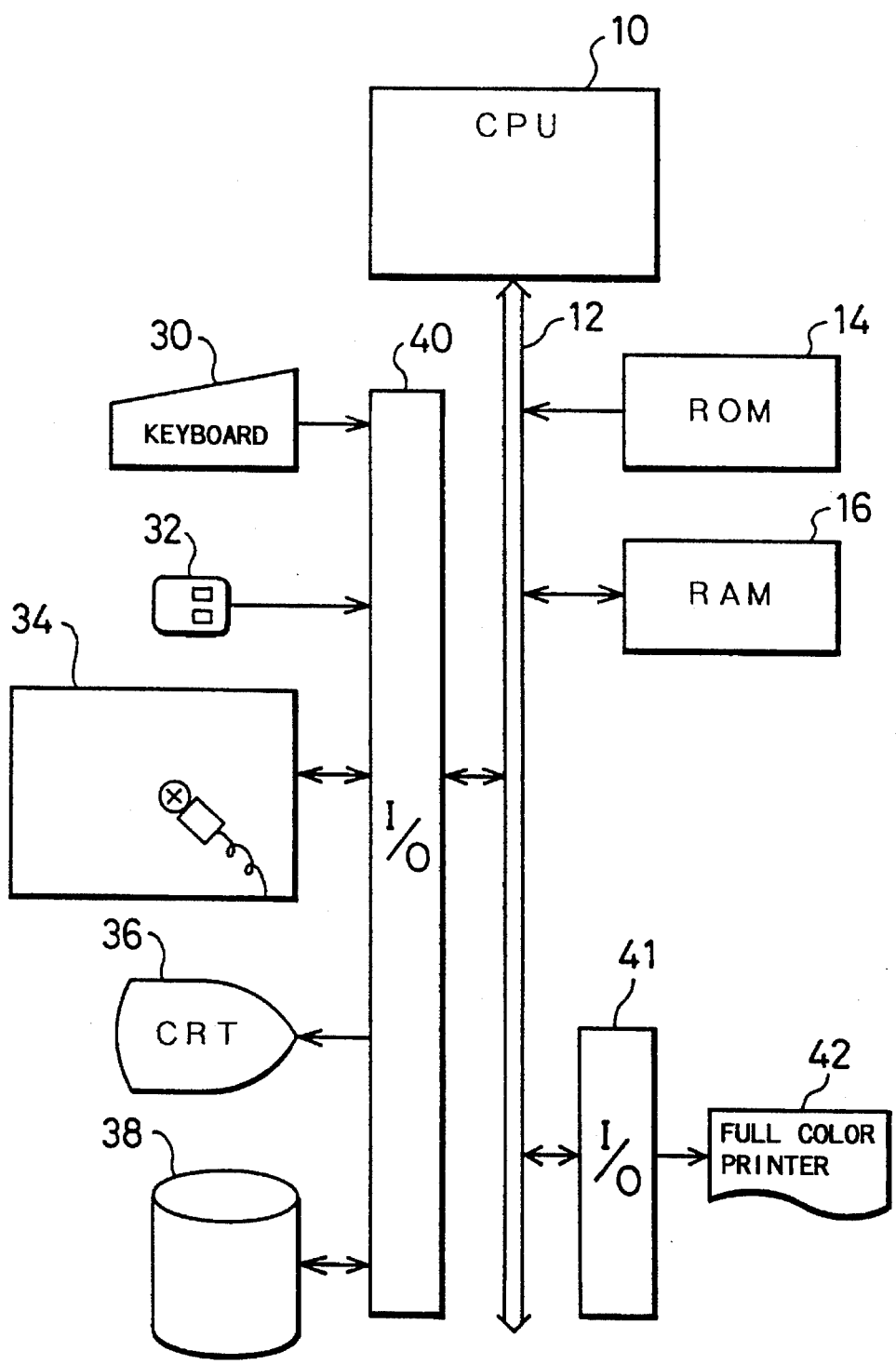
FIG. 8 is a block diagram showing a computer system embodying the invention, which is used for reproducing a color print disposed in the three-dimensional space.

FIG. 8 is a block diagram showing a computer system embodying the invention, which is used for reproducing a color print disposed in the three-dimensional space. The computer system includes a CPU 10 and a bus line 12. The bus line 12 is coupled to a ROM 14 and a RAM 16 and via input-output interfaces 40 and 41 to a keyboard 30, a mouse 32, a digitizer 34, a color CRT 36, a magnetic disk 38, and a full color printer 42. The CPU 10 executes application programs stored in the ROM 14 or loaded to the RAM 16 to implement the processing described below. The computer system performs a rendering process to reproduce a color print disposed in the three-dimensional space.

Figure 9:
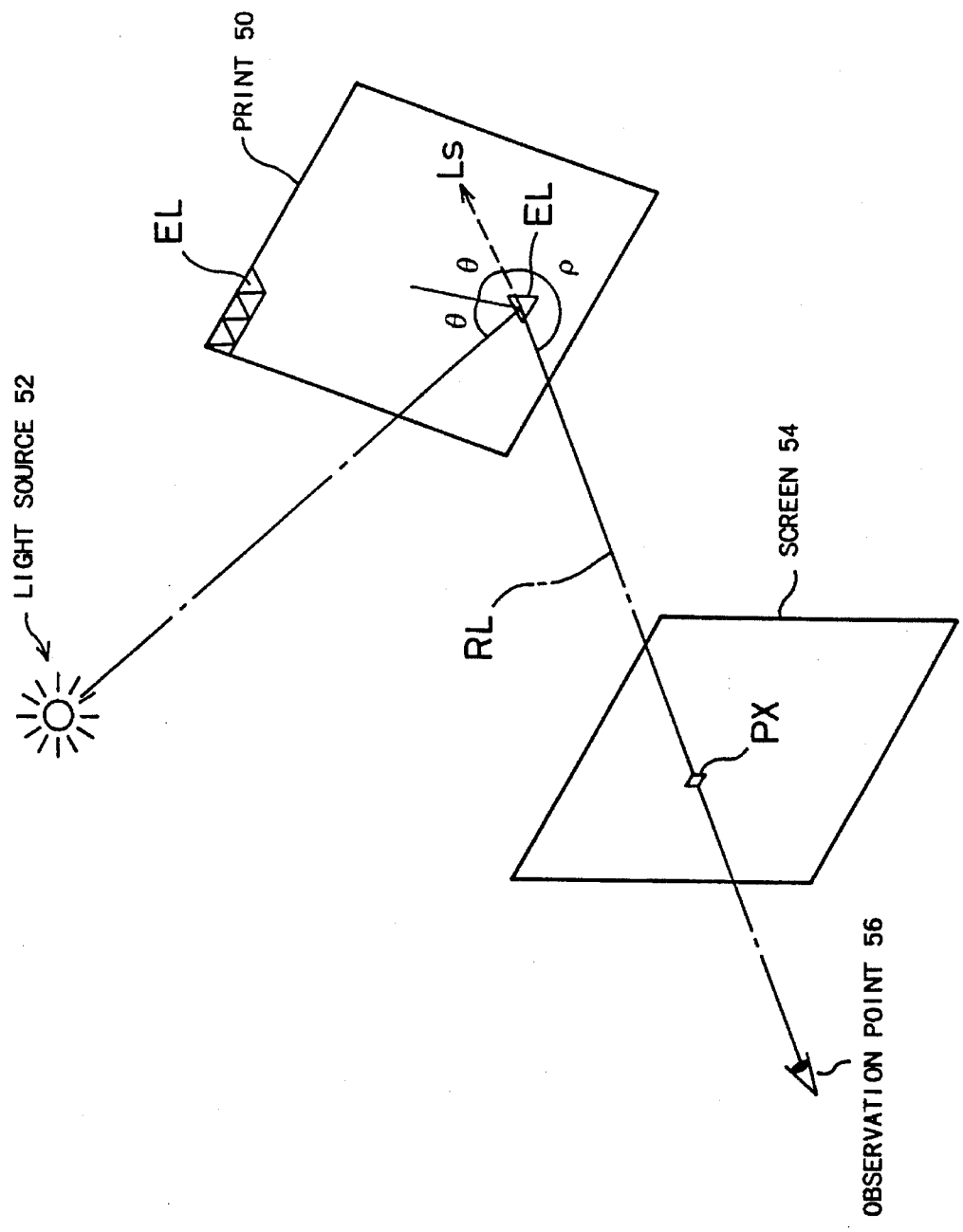
FIG. 9 shows a three-dimensional orientation in color reproduction of a color print used in a ray tracing technique.

FIG. 9 shows a three-dimensional orientation of a color print 50, a light source 52, a screen 54 of the CRT, and an observation point 56 which is used in rendering by Ray Tracing. Ray Tracing is a known rendering process in three-dimensional computer graphics, which determines color data (RGB data) of each pixel PX on the screen 54 by following a ray line RL running through each pixel PX on the screen 54 and the observation point 56 reversely from the observation point 56 to the light source 52. The print 50 is previously divided into a plurality of small polygons EL. Although each polygon EL is flat, the whole print 50 may be modeled to have a three-dimensional curve. The angle of incidence θ and the angle of deviation p are defined at the small polygon EL which exists on an intersection of the ray line RL and the print 50 as shown in FIG. 9.

Figure 10:
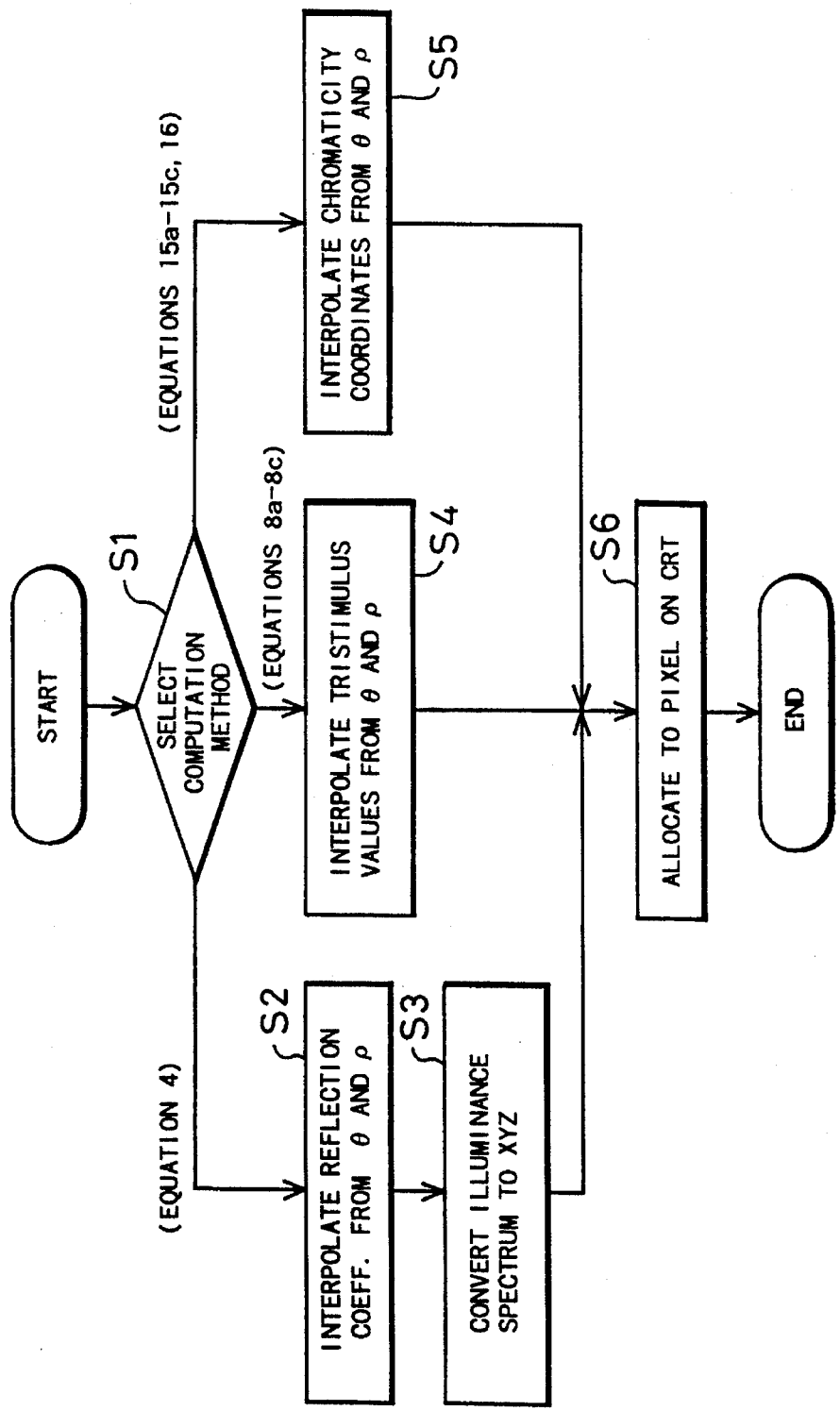
FIG. 10 is a flowchart showing a procedure for computing color data (RGB data) by the ray tracing technique.

FIG. 10 is a flowchart showing a procedure for computing color data (RGB data) of each pixel PX on the screen 54 by Ray Tracing. At step S1, one of the three methods of color computation is selected.

When the process according to Equation 4 is selected, the program goes to step S2 at which the reflection coefficients $S_s(\lambda)$ and $S_b(\lambda)$ are read out from the RAM 16 according to the angle of reflection θ and the angle of deviation ρ, or interpolated by the angle of reflection θ and the angle of deviation ρ, and the illuminance spectrum $I(\theta,\rho,\lambda)$ of the reflected light is determined. Data used in Equation 4, that is, the reflection coefficients $S_s(\lambda)$ and $S_b(\lambda)$, the exponent n, the luminance spectrum $\phi(\lambda)$ of the light source, and the illuminance spectrum $I_e(\lambda)$ of the environmental light, are loaded in advance from the magnetic disk 38 to the RAM 16.

At step S3, tristimulus values X, Y, and Z are determined by executing the integration of the illuminance spectrum $I(\theta,\rho,\lambda)$ by Equation 5. The program then proceeds to step S6 at which the tristimulus values X, Y, and Z are converted to RGB data and allocated to a pixel on the screen 54 of the CRT. In a concrete operation, RGB data are stored at each pixel position in a frame memory. The conversion from the XYZ colorimetric system to the RGB colorimetric system depends upon the properties of the output device. Application of a conversion equation suitable for the output device allows the precise color reproduction in the specific color reproduction range of the output device.

When the process according to Equations 8a–8c is selected, the program goes to step S4 at which the tristimulus values (X,Y,Z) of the reflected light are determined by reading out the tristimulus values (Xs,Ys,Zs), (Xb,Yb,Zb), and (Xe,Ye,Ze) from the RAM 16 according to the angle of reflection θ and the angle of deviation ρ, or by interpolating the tristimulus values (Xs,Ys,Zs), (Xb,Yb,Zb), and (Xe,Ye, Ze) by the angle of reflection θ and the angle of deviation ρ. Data used in Equations 5a–5c, that is, the tristimulus values (Xs,Ys,Zs), (Xb,Yb,Zb), and (Xe,Ye,Ze), the exponent n, and the factor k, are loaded in advance from the magnetic disk 38 to the RAM 16. The program then proceeds to step S6 at which the tristimulus values X, Y, and Z are converted to RGB data and allocated to a pixel on the screen 54 of the CRT.

When the process according to Equations 15a–15c and 16 is selected, the program goes to step S5 at which the chromaticity coordinates (x,y) of the reflected light are determined by reading out the chromaticity coordinates $(x_s,y_s)$, $(X_b,y_b)$, and $(X_e,y_e)$ from the RAM 16 according to the angle of reflection θ and the angle of deviation ρ, or by interpolating the chromaticity coordinates $(x_s,y_s)$, $(x_b,y_b)$, and $(X_e,y_e)$ by the angle of reflection θ and the angle of deviation ρ. Data used in Equations 15a–15c and 16, that is, the chromaticity coordinates $(x_s,y_s)$, $(x_b,y_b)$, and $(x_e,y_e)$, the exponent n, and the factors Ts, Tb, and Te, are loaded in advance from the magnetic disk 38 to the RAM 16. The program then proceeds to step S6 at which the chromaticity coordinates (x,y) thus obtained are converted to RGB data and allocated to a pixel on the screen 54 of the CRT. In the process according to Equations 15a–15c and 16, the chromaticity coordinates (x,y) determine only the relative values of RGB data but no absolute values. Accordingly, the absolute levels of RGB data will be determined separately.

As described above, the tristimulus values X, Y, Z in the device-independent CIE-XYZ colorimetric system or their chromaticity coordinates (x,y) can be obtained by any of the three methods of color computation. By converting the tristimulus values X, Y, Z or the chromaticity coordinates (x,y) to another colorimetric system (RGB colorimetric system, YMCK colorimetric system, or the like) with a conversion equation suitable to the output device, such as a color CRT and a printer, the color of the color print is precisely reproduced with the output device within its specific color reproduction range.

The above embodiment is only illustrative and not restrictive in any sense. There may be many modifications, alterations, and changes without departing from the scope or spirit of essential characteristics of the invention, for example, as follows:

(1) Any other device-independent colorimetric systems such as CIE-L*a*b* colorimetric system and CIE-L*u*v* colorimetric system are applicable in place of the CIE-XYZ colorimetric system used in the above embodiment.

(2) The reflection coefficients $S_s(\lambda)$ and $S_b(\lambda)$ can be determined by the following method. Illuminance is first measured for each color ink, that is, yellow, cyan, and magenta. The chromaticity coordinates (x,y) are then calculated from the measured illuminance and plotted in an x-y chromaticity diagram as shown in FIG. 6 or 7. The innermost chromaticity point in the series of chromaticity coordinates (x,y) is selected and the illuminance spectrum of the selected point is used to determine a spectral reflection coefficient, which is used as the specular reflection coefficient $S_s(\lambda)$. The outer-most chromaticity point in the series of chromaticity coordinates (x,y) is selected and the illuminance spectrum of the selected point is used to determine another spectral reflection coefficient, which is used as the internal reflection coefficient $S_b(\lambda)$. These reflection coefficients $S_s(\lambda)$ and $S_b(\lambda)$ are determined for each color ink, accordingly. This method realizes simple determination of the reflection coefficients $S_s(\lambda)$ and $S_b(\lambda)$.

(3) Although only one light source 52 is used in the color reproduction process of the embodiment, a plurality of light sources may be used for computation of color data of each pixel PX on the screen 54 to attain more natural color reproduction. In the actual room or natural environment, the condition that the print is irradiated with light emitted from only one light source is seldom found, but the print is generally irradiated with various light. In the color reproduction process with a plurality of light sources, color data of each pixel PX are obtained for each light source according to the routine shown in FIG. 10 and then accumulated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of simulating a color of each reflection point in a color print observed by an observer with an output device, the color print being disposed in a three-dimensional space and irradiated by a light source, the light source emitting a light beam having a luminance spectrum $\phi(\lambda)$ where $\lambda$ denotes a wavelength of the light beam, the method comprising the steps of:

determining an illuminance spectrum $I(\theta,\rho,\lambda)$ of reflected light reflected at the reflection point according to an equation:

$$I(\theta,\rho,\lambda) = \{S_s(\lambda)\cdot\cos^n\rho + S_b(\lambda)\cdot\cos\theta\}\phi(\lambda) + I_e(\lambda)$$

wherein $S_b(\lambda)$ and $S_s(\lambda)$ denote first and second reflection coefficients, respectively, $\rho$ denotes an angle between a first direction of the reflected light and a second direction from the reflection point to the observer, n is a constant, $\theta$ denotes an angle of reflection of the reflected light, and $I_e(\lambda)$ denotes an illuminance spectrum of environmental light observed by the observer;

integrating the illuminance spectrum $I(\theta,\rho,\lambda)$ over a wavelength range of visible light with respective three color matching functions of a device-independent colorimetric system, to thereby obtain tristimulus values in the device-independent colorimetric system representing the color of the reflection point; and producing an image of the color print with the output device as a function of the tristimulus values.

2. A method in accordance with claim 1, wherein the first reflection coefficient $S_s(\lambda)$ regarding specular reflection light depends upon the wavelength $\lambda$.

3. A method in accordance with claim 1, further comprising the step of:

converting the tristimulus values to color data in a specific colorimetric system of the output device.

4. A method in accordance with claim 1, wherein the illuminance spectrum $I_e(\lambda)$ of environmental light is equal to zero.

5. A method in accordance with claim 1, wherein the device-independent colorimetric system is CIE-XYZ colorimetric system.

6. A method of simulating a color of each reflection point in a color print observed by an observer with an output device, the color print being disposed in a three-dimensional space and irradiated by a light source, the light source emitting a light beam having a luminance spectrum $\phi(\lambda)$ where $\lambda$ denotes a wavelength of the light beam, the method comprising the steps of:

determining target tristimulus values X, Y, and Z of a device-independent colorimetric system for reflected light reflected at the reflection point according to equations:

$$X = k\{\cos^n\rho \cdot X_s + \cos\theta \cdot X_b + X_e\}$$

$$Y = k\{\cos^n\rho \cdot Y_s + \cos\theta \cdot Y_b + Y_e\}$$

$$Z = k\{\cos^n\rho \cdot Z_s + \cos\theta \cdot Z_b + Z_e\}$$

where $(X_s,Y_s,Z_s)$, $(X_b,Y_b,Z_b)$, and $(X_e,Y_e,Z_e)$ respectively denote first, second, and third sets of tristimulus values, k is a first constant, $\rho$ denotes an angle between a first direction of the reflected light and a second direction from the reflection point to the observer, n is a second constant, and $\theta$ denotes an angle of reflection of the reflected light; and producing an image of the color print with the output device as a function of the target tristimulus values X, Y, and Z.

7. A method in accordance with claim 6, further comprising the step of:

converting the target tristimulus values X, Y, and Z to color data of a specific colorimetric system of the output device.

8. A method in accordance with claim 6, wherein the third set of tristimulus values $(X_e,Y_e,Z_e)$ regarding environmental light are equal to zero.

9. A method of simulating a color of each reflection point in a color print observed by an observer with an output device, the color print being disposed in a three-dimensional space and irradiated by a light source, the light source emitting a light beam having a luminance spectrum $\phi(\lambda)$ where $\lambda$ denotes a wavelength of the light beam, the method comprising the steps of:

determining target chromaticity coordinates (x,y) of a device-independent colorimetric system for reflected light reflected at the reflection point according to equations:

$$(x,y) = C_s \cdot (x_s,y_s) + C_b \cdot (x_b,y_b) + C_e \cdot (x_e,y_e)$$

$$C_s = \frac{\cos^n\rho \cdot T_s}{\cos^n\rho \cdot T_s + \cos\theta \cdot T_b + T_e}$$

$$C_b = \frac{\cos\theta \cdot T_b}{\cos^n\rho \cdot T_s + \cos\theta \cdot T_b + T_e}$$

$$C_e = \frac{T_e}{\cos^n\rho \cdot T_s + \cos\theta \cdot T_b + T_e}$$

where $(x_s,y_s)$, $(x_b,y_b)$, and $(x_e,y_e)$ denote first, second, and third chromaticity coordinates, $T_s$, $T_b$, and $T_e$ are constants, $\rho$ denotes an angle between a first direction of the reflected light and a second direction from the reflection point to the observer, n is a constant, and $\theta$ denotes an angle of reflection of the reflected light; and producing an image of the color print with the output device as a function of the target chromaticity coordinates (x,y).

10. A method in accordance with claim 9, further comprising the step of:

converting the target chromaticity coordinates (x,y) to color data of a specific colorimetric system of the output device.

11. A method in accordance with claim 9, wherein the third set of chromaticity coordinates $(x_e, y_e)$ and the constant $T_e$ regarding environmental light are equal to zero.

12. An apparatus for simulating a color of each reflection point in a color print observed by an observer, the color print being disposed in a three-dimensional space and irradiated by a light source, the light source emitting a light beam having a luminance spectrum $\phi(\lambda)$ where $\lambda$ denotes a wavelength of the light beam, the apparatus comprising:

means for determining an illuminance spectrum $I(\theta,\rho,\lambda)$ of reflected light reflected at the reflection point according to an equation:

$I(\theta,\rho,\lambda) = \{S_s(\lambda) \cdot \cos^n \rho + S_b(\lambda) \cdot \cos \theta\} \phi(\lambda) + I_e(\lambda)$ wherein $S_b(\lambda k)$ and $S_s(\lambda)$ denote first and second reflection coefficients, respectively, $\rho$ denotes an angle between a first direction of the reflected light and a second direction from the reflection point to the observer, n is a constant, $\theta$ denotes an angle of reflection, and $I_e(\lambda)$ denotes an illuminance spectrum of environmental light observed by the observer;

means for integrating the illuminance spectrum $I(\theta,\rho,\lambda)$ of the reflected light over a wavelength range of visible light with three color matching functions, respectively, of a device-independent colorimetric system, to thereby obtain tristimulus values in the device-independent colorimetric system; and output means for producing an image of the color print as a function of the tristimulus values.

13. An apparatus in accordance with claim 12, wherein the first reflection coefficient $S_s(\lambda)$ regarding specular reflection light depends upon the wavelength $\lambda$.

14. An apparatus in accordance with claim 12, further comprising:

means for converting the tristimulus values to color data of a specific colorimetric system of said output means.

15. An apparatus in accordance with claim 12, wherein the illuminance spectrum $I_e(\lambda)$ of environmental light is equal to zero.

16. An apparatus in accordance with claim 12, wherein the device-independent colorimetric system is CIE-XYZ colorimetric system.

17. An apparatus for simulating a color of each reflection point in a color print observed by an observer, the color print being disposed in a three-dimensional space and irradiated by a light source, the light source emitting a light beam having a luminance spectrum $\phi(\lambda)$ where $\lambda$ denotes a wavelength of the light beam, the apparatus comprising:

means for determining target tristimulus values X, Y, and Z of a device-independent colorimetric system for reflected light reflected at the reflection point according to equations:

$X = k\{\cos^n \rho \cdot X_s + \cos \theta \cdot X_b + X_e\}$ $Y = k\{\cos^n \rho \cdot Y_s + \cos \theta \cdot Y_b + Y_e\}$ $Z = k\{\cos^n \rho \cdot Z_s + \cos \theta \cdot Z_b + Z_e\}$ where $(X_s, Y_s, Z_s)$, $(X_b, Y_b, Z_b)$, and $(X_e, Y_e, Z_e)$ respectively denote first, second, and third sets of tristimulus values, k is a first constant, $\rho$ denotes an angle between a first direction of the reflected light and a second direction from the reflection point to the observer, n is a second constant, and $\theta$ denotes an angle of reflection of the reflected light; and output means for producing an image of the color print as a function of the target tristimulus values X, Y, and Z.

18. An apparatus in accordance with claim 17, further comprising:

means for converting the target tristimulus values X, Y, and Z to color data of a specific colorimetric system of said output means.

19. An apparatus in accordance with claim 17, wherein the third set of tristimulus values $(X_e, Y_e, Z_e)$ regarding environmental light are equal to zero.

20. An apparatus for simulating a color of each reflection point in a color print observed by an observer, the color print being disposed in a three-dimensional space and irradiated by a light source, the light source emitting a light beam having a luminance spectrum $\phi(\lambda)$ where $\lambda$ denotes a wavelength of the light beam, the apparatus comprising:

means for determining target chromaticity coordinates (x,y) of a device-independent colorimetric system for reflected light according to equations:

$(x,y) = C_s \cdot (x_s, y_s) + C_b \cdot (x_b, y_b) + C_e \cdot (x_e, y_e)$ $$C_s = \frac{\cos^n \rho \cdot T_s}{\cos^n \rho \cdot T_s + \cos \theta \cdot T_b + T_e}$$

$$C_b = \frac{\cos \theta \cdot T_b}{\cos^n \rho \cdot T_s + \cos \theta \cdot T_b + T_e}$$

$$C_e = \frac{T_e}{\cos^n \rho \cdot T_s + \cos \theta \cdot T_b + T_e}$$

where $(x_s, y_s)$, $(x_b, y_b)$, and $(x_e, y_e)$ denote first, second, and third chromaticity coordinates, $T_s$, $T_b$, and $T_e$ are constants, $\rho$ denotes an angle between a first direction of the reflected light and a second direction from the reflection point to the observer, n is a constant, and $\theta$ denotes an angle of reflection of the reflected light; and output means for producing an image of the color print as a function of the target chromaticity coordinates (x,y).

21. An apparatus in accordance with claim 20, further comprising:

converting the target chromaticity coordinates (x,y) in the device-independent colorimetric system to color data of a specific colorimetric system of said output means.

22. An apparatus in accordance with claim 20, wherein the third set of chromaticity coordinates $(x_e, y_e)$ and the constant $T_e$ regarding environmental light are equal to zero.

\* \* \* \* \*